United States Patent
Mani

(10) Patent No.: US 10,860,367 B2
(45) Date of Patent: Dec. 8, 2020

(54) OPPORTUNISTIC VIRTUAL MACHINE MIGRATION

(71) Applicant: MICROSOFT TECHNOLOGY LICENSING, LLC, Redmond, WA (US)

(72) Inventor: Ajay Mani, Woodinville, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 282 days.

(21) Appl. No.: 15/921,011

(22) Filed: Mar. 14, 2018

(65) Prior Publication Data
US 2019/0286475 A1  Sep. 19, 2019

(51) Int. Cl.
*G06F 9/48* (2006.01)
*G06F 9/455* (2018.01)
*G06F 9/50* (2006.01)
*H04L 29/08* (2006.01)

(52) U.S. Cl.
CPC ........ *G06F 9/4856* (2013.01); *G06F 9/45558* (2013.01); *G06F 9/5077* (2013.01); *G06F 2009/4557* (2013.01); *H04L 67/10* (2013.01)

(58) Field of Classification Search
None
See application file for complete search history.

(56) References Cited

U.S. PATENT DOCUMENTS

| 9,348,646 | B1* | 5/2016 | Daya ..................... G06F 9/4856 |
| 9,672,054 | B1* | 6/2017 | Gupta ................. G06F 9/45558 |
| 2016/0306675 | A1* | 10/2016 | Wiggers ................ G06F 9/4856 |
| 2017/0147380 | A1 | 5/2017 | Brenneman et al. |
| 2017/0269951 | A1 | 9/2017 | Gupta et al. |
| 2017/0364387 | A1* | 12/2017 | Ahmed ................. G06F 9/4856 |

OTHER PUBLICATIONS

"International Search Report and Written Opinion issued in PCT Application No. PCT/US19/021061", dated May 29, 2019, 21 Pages.

Polze, et al., "Timely Virtual Machine Migration for Pro-Active Fault Tolerance", In Proceedings of 14th IEEE International Symposium on Object/Component/Service-Oriented Real-Time Distributed Computing Workshops, Mar. 2011, 10 Pages.

* cited by examiner

*Primary Examiner* — Lewis A Bullock, Jr.
*Assistant Examiner* — Melissa A Headly
(74) *Attorney, Agent, or Firm* — Newport IP, LLC; Han Gim

(57) ABSTRACT

Techniques are disclosed for providing opportunistic virtual machine migration. In response to determining that a virtual machine will be rebooted, a determination is made whether the virtual machine should be migrated from the computing device that is currently hosting the virtual machine. Based on one or more criteria, a destination computing device for the virtual machine is identified. When a performance threshold is met, subsequent to shutting down the virtual machine at the current host and prior to rebooting the virtual machine at a new host, the virtual machine is migrated to the destination computing device.

18 Claims, 8 Drawing Sheets

OPPORTUNISTIC VIRTUAL MACHINE MIGRATION

BACKGROUND

A data center is a facility that houses computer systems and various networking, storage, and other related components. Data centers may, for example, provide computing services to businesses and individuals as a remote computing service or provide "software as a service" (e.g., cloud computing).

To facilitate efficient utilization of data center resources, virtualization technologies allow a physical computing device to host one or more virtual machines ("VM") that appear and operate as independent computer devices to a connected user. The data center can create, maintain or delete virtual machines in a dynamic manner.

When a failure of a physical computing device of a data center occurs, customers may lose data or may be unable to provide services to their downstream customers, which may result in lost revenue and customer dissatisfaction. Additionally, when a virtual machine is migrated for scheduled maintenance, the resulting downtime, while known in advance, will nevertheless require loss of use while the virtual machine is shut down and migrated. It is with respect to these considerations and others that the disclosure made herein is presented.

SUMMARY

The disclosed embodiments describe technologies for data centers to migrate virtual machines in a way that reduces the impact on users' continued access to their allocated virtual machines, while allowing data centers to adhere to operational objectives and at the same time improve operating efficiencies.

Virtual machines may be migrated for a number of reasons. For example, it may be desirable to migrate a virtual machine to a new computing device that is loaded with a more current software version or that has newer or more suitable hardware attributes. In such cases, virtual machines can be identified for removal from their current host computing devices and migrated to a new host computing device.

One way to migrate virtual machines is live migration, during which portions of a running virtual machine are copied to a new host while the user still has access to the running virtual machine. When a sufficient amount of the virtual machine has been copied so that the virtual machine can be launched in the new host, the new virtual machine is launched and the customer is allowed to seamlessly use the new virtual machine on the new host while the remaining portions of the virtual machine continue to be copied to the new host. However, a number of factors can make live migration less than ideal for certain cases, such as software incapability, stringent requirements for the VM which cause performance issues during live migration, the source and target computing devices being incompatible (e.g., differing CPU types), version incompatibilities, and space constraints. Furthermore, if the host computing device goes bad or goes down, then the virtual machines running on that device will need to be migrated.

To alleviate some of these issues, a traditional migration may be performed, where the virtual machine is shut down and a full migration is performed to a new host machine. One disadvantage of this approach is that if the migration is necessitated by a failure of the host, the migration may be delayed until a new host is identified that meets or exceeds the requirements for the virtual machine. Furthermore, the necessity of shutting down and restarting the virtual machine is a standalone operation that is performed solely for the purpose of the unanticipated migration event and does not serve other beneficial purposes.

Another disadvantage of traditional migration is that the local temporary disk that is attached to the virtual machine is not saved when the virtual machine is shut down and migrated. Typically, the temporary scratch space disk is currently implemented as a temporary space on the hard disk drive of a host computing device that is allocated for temporary storage and is not persisted. However, it is desirable in many cases to preserve the data in the temporary disk so that data center users can quickly resume operations after migration to the new host device and take advantage of the greater I/O performance of local storage disks. Thus, additional steps would need to be taken to preserve the temporary local disk data and restore the saved data at the new host.

The present disclosure describes techniques for determining opportunities for migrating virtual machines to new hosts by (1) identifying actions that indicate that the virtual machine will go offline, (2) determining whether the virtual machine should be migrated to a new host, (3) if so, determining an appropriate destination host, and (4) performing the migration opportunistically so as to reduce impact to the user's access to the current host virtual machine. Such migrations may be referred to as an "opportunistic migration" or a "migration after reboot or restart" in the present disclosure.

In one example, when a user initiates a shutdown of his/her virtual machine, or when the provider of the virtual machine detects that a shutdown and restart is to be initiated, the data center or service provider may make the determination to migrate the virtual machine to a new host device. Since the shutdown is planned and expected, the customer or user of the virtual machine already expects a shutdown/restart and thus may not be as impacted by the shutdown as would be the case if the shutdown was unexpected.

Furthermore, the user may be provided by the service provider with the option of selecting the shutdown/restart event to be performed concurrently with a migration event. By providing such visibility and options to the user, the need for a more intrusive dead migration at an inopportune time may be avoided. In other words, the user may be provided the opportunity to piggyback a required migration with a known shutdown/restart event.

In some embodiments, when a command or request is detected that requires a shutdown/restart, the service provider may determine whether the virtual machine associated with the detected command requires maintenance such that a migration needs to be scheduled. This determination may be made based on one or more criteria. For example, the service provider may determine whether the virtual machine requires or would benefit from being hosted on a computing device with different or improved features. The service provider may determine whether a candidate computing device is available that meets or exceeds a predetermined set of criteria. As another example, the service provider may determine that the current host computing device has a threshold likelihood of failure within a specified timeframe, and that the virtual machines executing on the computing device should be migrated by a specified deadline to avoid interruption of service to the user.

Additionally, the service provider may determine whether to migrate a virtual machine based on the time and resources required to perform the migration. Reboots may have characteristic timing profiles that determine when the rebooted virtual machine will be available for use. This time frame may be compared to the expected time for the migration of the virtual machine. Based on this comparison, the service provider may determine if the opportunistic migration should be allowed to proceed. Such a determination may be made based in part on a service level objective (SLO) by the service provider for the user.

In some embodiments, the local state data for the virtual machine may be persisted and migrated or otherwise made available to the virtual machine after migration to the new host device. Local and temporary user state data is typically provided using local memory which provides speed and performance advantages as compared to persisted long-term storage. In many cases, the local temporary storage may be used to cache data for running applications or for data that is frequently accessed. When a full migration takes place, the data in the local storage is typically lost to the user and is not persisted. Accordingly, once the virtual machine is migrated and launched at the new host, the temporary data will need to be rebuilt as applications are executed and application data is retrieved and cached. If the local state data is desired after full migration, steps will need to be taken to save and reconstruct the local state data.

The present disclosure provides ways to save and migrate the data in local temporary storage so that when a virtual machine is migrated in an opportunistic manner to a new host as described herein, the local data from the current host is migrated or otherwise made available to the virtual machine at the new host so that it need not be repopulated.

By providing such a mechanism for opportunistic virtual machine migration based on known anticipated shutdown activity, virtual machines that are scheduled for migration due to maintenance or other factors may be more efficiently migrated, reducing downtime and impact to the user, and providing for a more efficient migration and thus greater operational efficiency for service provider operators of virtual machines.

Disclosed herein are methods and systems for allocating the placement of virtual machines on one or more host computing devices. The methods and systems may include receiving a request to reboot a virtual machine. In response to the request, it may be determined that the virtual machine should be migrated from a computing device currently hosting the virtual machine. Based on one or more criteria, a destination computing device for the virtual machine may be identified. Subsequent to shutting down the virtual machine at the current host and prior to rebooting the virtual machine at the new host, the virtual machine may be migrated to the destination computing device when a performance threshold is met. In some embodiments, the migration may utilize the request to reboot a virtual machine to mitigate the need for a previously scheduled migration for maintenance associated with the currently hosting computing device. Additionally, local state data for the virtual machine may be migrated to the new host based on a determination that migration of the local state data meets one or more criteria.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the description detailed herein, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

The following Detailed Description describes technologies for migrating virtual machines based on conditions that reduce impact on a user's access to their virtual machines, while allowing data centers to adhere to operational objectives while reducing cost. In some embodiments, the described techniques for migration may be referred to as opportunistic migration or migration on reboot or restart.

Figure 1:
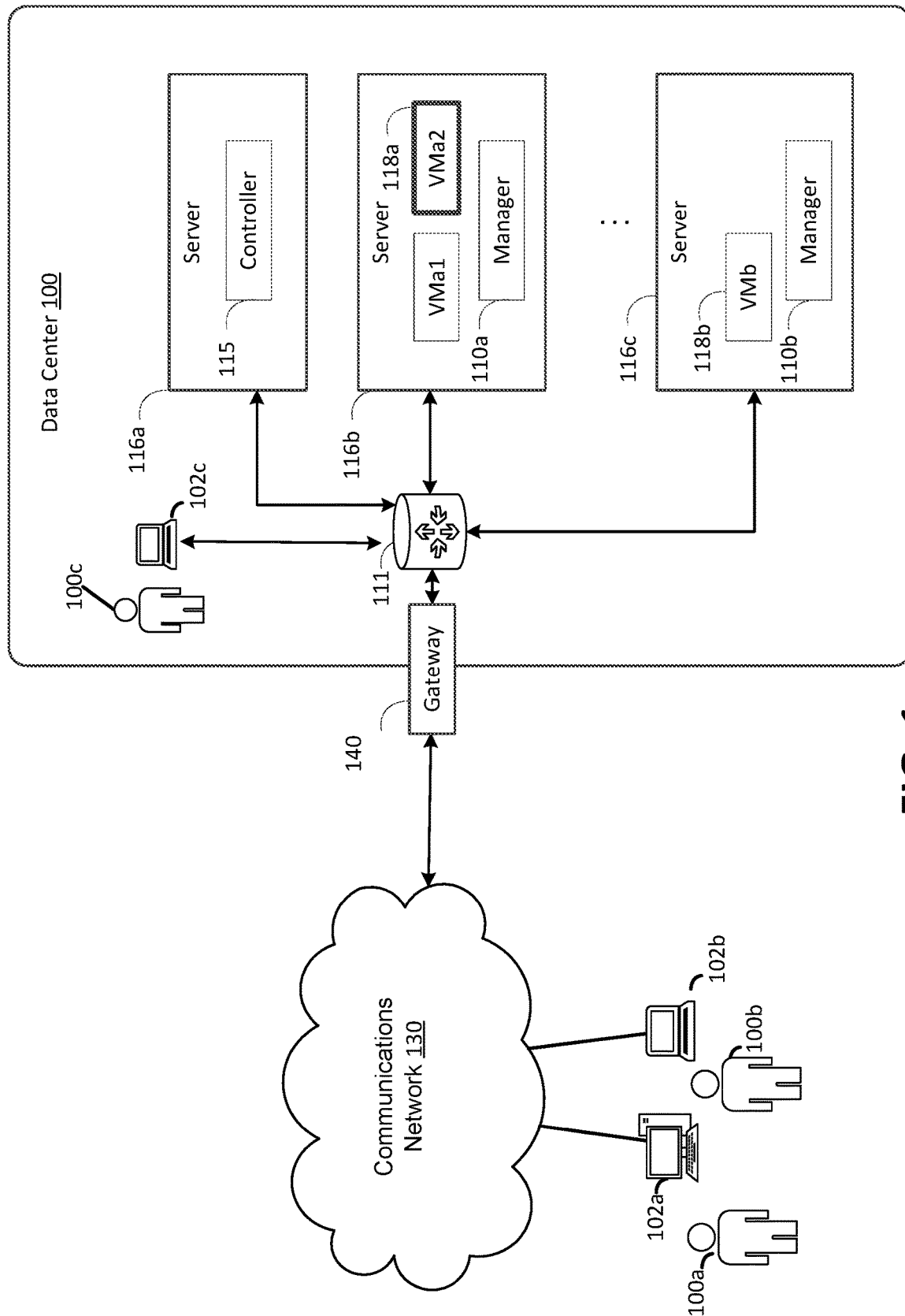
FIG. 1 is a diagram illustrating a data center for providing and allocating virtualized resources in accordance with the present disclosure.

FIG. 1 illustrates an example computing environment in which the embodiments described herein may be implemented. FIG. 1 illustrates a data center 100 that configured to provide computing resources to users 100a, 100b, or 100c (which may be referred herein singularly as "a user 100" or in the plural as "the users 100") via user computers 102a, 102b, and 102c (which may be referred herein singularly as "a computer 102" or in the plural as "the computers 102") via a communications network 130. The computing resources provided by the data center 100 may include various types of resources, such as computing resources, data storage resources, data communication resources, and the like. Each type of computing resource may be general-purpose or may be available in a number of specific configurations. For example, computing resources may be available as virtual machines. The virtual machines may be configured to execute applications, including Web servers, application servers, media servers, database servers, and the like. Data storage resources may include file storage devices, block storage devices, and the like. Each type or configuration of computing resource may be available in different configurations, such as the number of processors, and size of memory and/or storage capacity. The resources may in some embodiments be offered to clients in units referred to as instances, such as virtual machine instances or storage instances. A virtual computing instance may be referred to as a virtual machine and may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

Data center 100 may include servers 116a, 116b, and 116c (which may be referred to herein singularly as "a server 116" or in the plural as "the servers 116") that provide computing resources available as virtual machines 118a and 118b (which may be referred to herein singularly as "a virtual machine 118" or in the plural as "the virtual machines 118"). The virtual machines 118 may be configured to execute applications such as Web servers, application servers, media servers, database servers, and the like. Other resources that may be provided include data storage resources (not shown on FIG. 1) and may include file storage devices, block storage devices, and the like. Servers 116 may also execute functions that manage and control allocation of resources in the data center, such as a controller 115. Controller 115 may be a fabric controller or another type of program configured to manage the allocation of virtual machines on servers 116.

Referring to FIG. 1, communications network 130 may, for example, be a publicly accessible network of linked networks and may be operated by various entities, such as the Internet. In other embodiments, communications network 130 may be a private network, such as a corporate network that is wholly or partially inaccessible to the public.

Communications network 130 may provide access to computers 102. Computers 102 may be computers utilized by users 100. Computer 102a, 102b or 102c may be a server, a desktop or laptop personal computer, a tablet computer, a smartphone, a set-top box, or any other computing device capable of accessing data center 100. User computer 102a or 102b may connect directly to the Internet (e.g., via a cable modem). User computer 102c may be internal to the data center 100 and may connect directly to the resources in the data center 100 via internal networks. Although only three user computers 102a, 102b, and 102c are depicted, it should be appreciated that there may be multiple user computers.

Computers 102 may also be utilized to configure aspects of the computing resources provided by data center 100. For example, data center 100 may provide a Web interface through which aspects of its operation may be configured through the use of a Web browser application program executing on user computer 102. Alternatively, a stand-alone application program executing on user computer 102 may be used to access an application programming interface (API) exposed by data center 100 for performing the configuration operations.

Servers 116 may be configured to provide the computing resources described above. One or more of the servers 116 may be configured to execute a manager 120a or 120b (which may be referred herein singularly as "a manager 120" or in the plural as "the managers 120") configured to execute the virtual machines. The managers 120 may be a virtual machine monitor (VMM), fabric controller, or another type of program configured to enable the execution of virtual machines 118 on servers 116, for example.

It should be appreciated that although the embodiments disclosed above are discussed in the context of virtual machines, other types of implementations can be utilized with the concepts and technologies disclosed herein. For example, the embodiments disclosed herein might also be utilized with computing systems that do not utilize virtual machines.

In the example data center 100 shown in FIG. 1, a router 111 may be utilized to interconnect the servers 116a and 116b. Router 111 may also be connected to gateway 140, which is connected to communications network 130. Router 111 may manage communications within networks in data center 100, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 1 has been greatly simplified and that many more networks and networking devices may be utilized to interconnect the various computing systems disclosed herein. These network topologies and devices should be apparent to those skilled in the art.

It should also be appreciated that data center 100 described in FIG. 1 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, smartphone, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

In one embodiment, the service provider providing services via data center 100 may implement a function that is configured to identify when a command or request is sent or received that is associated with maintenance of a virtual machine. In some embodiments, such a function may be referred to as a migration manager or a reboot determination function. When such a command or request is detected, the service provider may determine if the virtual machine associated with the detected command or request requires maintenance such that a migration needs to be scheduled. This determination may be made based on one or more criteria. The criteria may include one or more of a required change in hardware configuration, a change in software configuration, or maintenance requirements for the currently hosting computing device. The criteria may also include operational requirements for the data center, such as collocating virtual machines for communication efficiency, improve security features, to improve load balancing, to retire aging hardware, and the like. For example, the migration manager may determine if the virtual machine requires or would benefit from being hosted on a computing device with different or improved hardware or software features. The migration manager may determine if a candidate host computing device is available that meets or exceeds the criteria for a machine that has such features.

Figure 2:
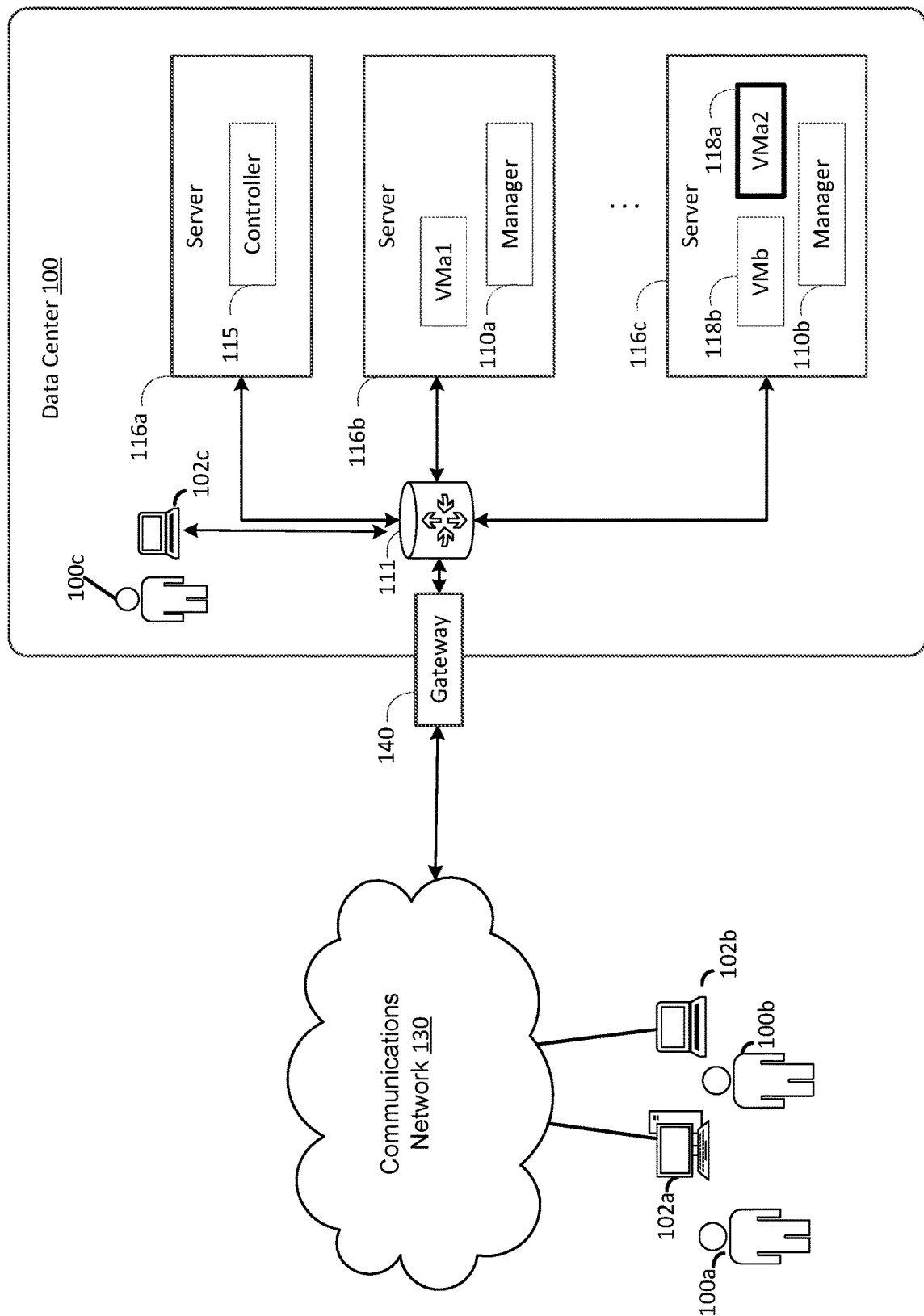
FIG. 2 is a diagram illustrating a data center for providing and allocating virtualized resources in accordance with the present disclosure.

As illustrated in FIG. 1, in one example, one of the virtual machines 118a labeled VMa2 may be identified as a virtual machine that should be migrated from server 116b which is currently hosting the virtual machine. Server 116c may be identified, based on one or more criteria, as a destination server for the virtual machine. Referring to FIG. 2, virtual machine 118a VMa2 may be migrated to server 116c when a performance threshold is met. In an embodiment, virtual machine 118a VMa2 may be migrated subsequent to shutting down the virtual machine at the current host 116b and prior to rebooting the virtual machine at the new host 116c. The migration may utilize a previously scheduled migration for maintenance time associated with server 116b to accomplish the migration. Additionally, local state data for virtual machine 118a VMa2 may also be migrated to server 116c based on a determination that migration of the local state data meets one or more criteria.

Figure 3:
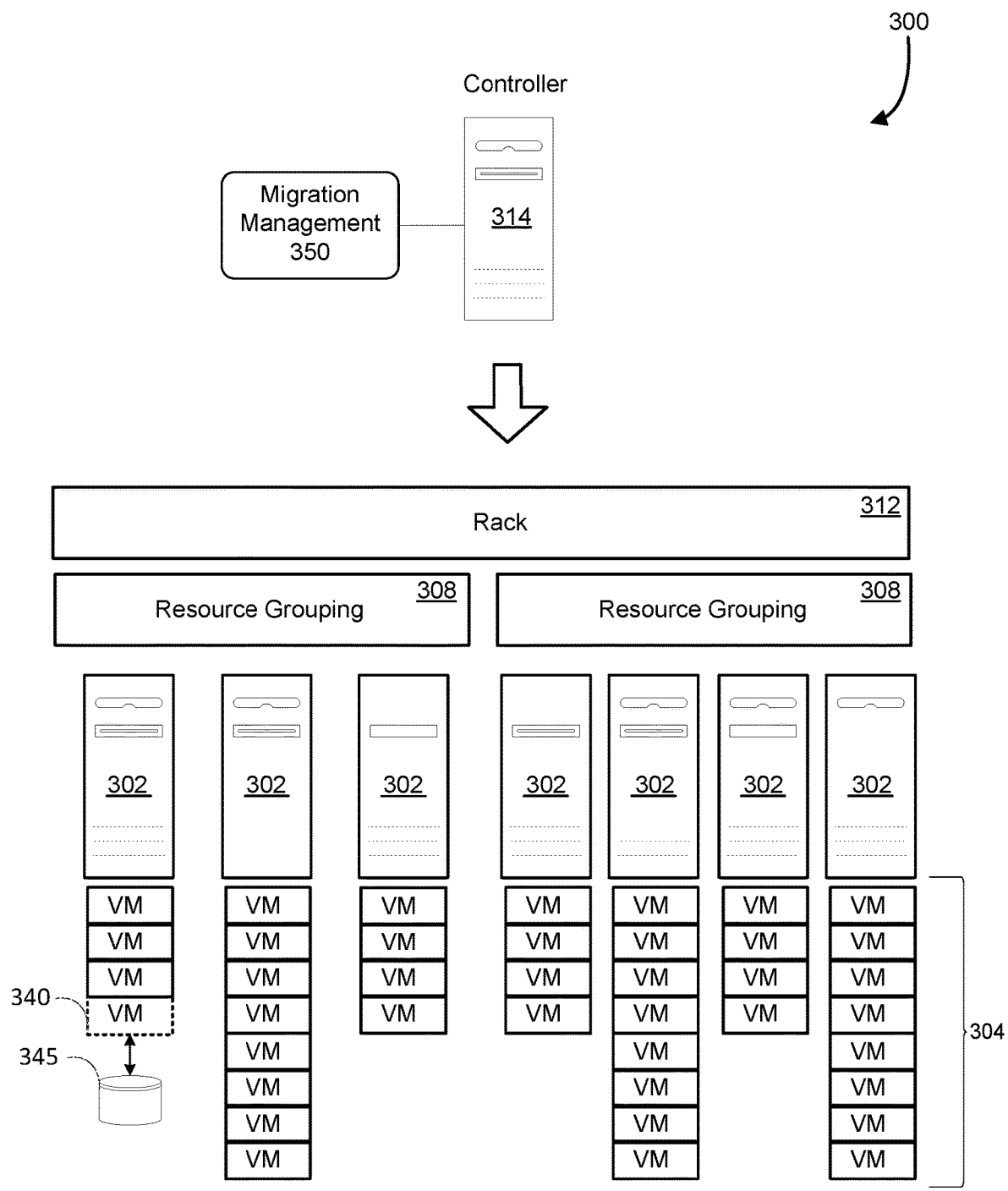
FIG. 3 is a diagram illustrating allocation and migration of virtual machine instances in accordance with the present disclosure.

In some embodiments, such as in FIG. 3, illustrated is a data center 300 that may be viewed as a collection of shared computing resources and shared infrastructure. For example, as shown in FIG. 3, a data center 300 may include virtual machine containers 304, physical hosts 302, logical groupings 308, and data center 312. A virtual machine container 304 may be referred to as a resource slot. The physical hosts 302 may vary in hardware and/or software configurations and thus may not be identical whether they are on the same physical rack or data center. A physical host 302 may be shared by multiple virtual machine containers 304, each container 304 being capable of hosting a virtual machine. Multiple physical hosts 302 may share resources such as a power supply (not shown on FIG. 3) provided on data center 312. Data center 312 may also include one or more routers (also not shown on FIG. 3) which may service multiple physical hosts 302 to route network traffic. A controller or provisioning server 314 may include a memory and processor configured with instructions to manage workflows for provisioning and de-provisioning computing resources as well as detecting health and/or failure of computing resources.

A provisioning server 314 may determine a placement of a resource within the data center. In some embodiments, this placement may be based at least in part on available computing resources and/or relationships between computing resources.

In an embodiment, the service provider may implement a migration management function 350 that is configured to identify when an event is detected that is associated with maintenance of a virtual machine. For example, when a command or request is sent or received that is associated with maintenance of a virtual machine, upon detection of the command/request, the migration management function 350 may determine if the virtual machine associated with the detected command/request requires maintenance such that a migration should be scheduled. This determination may be made based on one or more criteria. For example, the migration management function 350 may determine if the virtual machine requires or would benefit from being hosted on an alternate computing device with different or improved features. The service provider may determine if a candidate host computing device is available that meets or exceeds the criteria for a machine that has such features. It should be noted that the migration management function 350 may execute on provisioning server 314. In some embodiments, the functionality of migration management function 350 may also execute in whole or in part within the physical hosts 302. The functionality may also be distributed between the provisioning server 314 and physical hosts 302.

Figure 4:
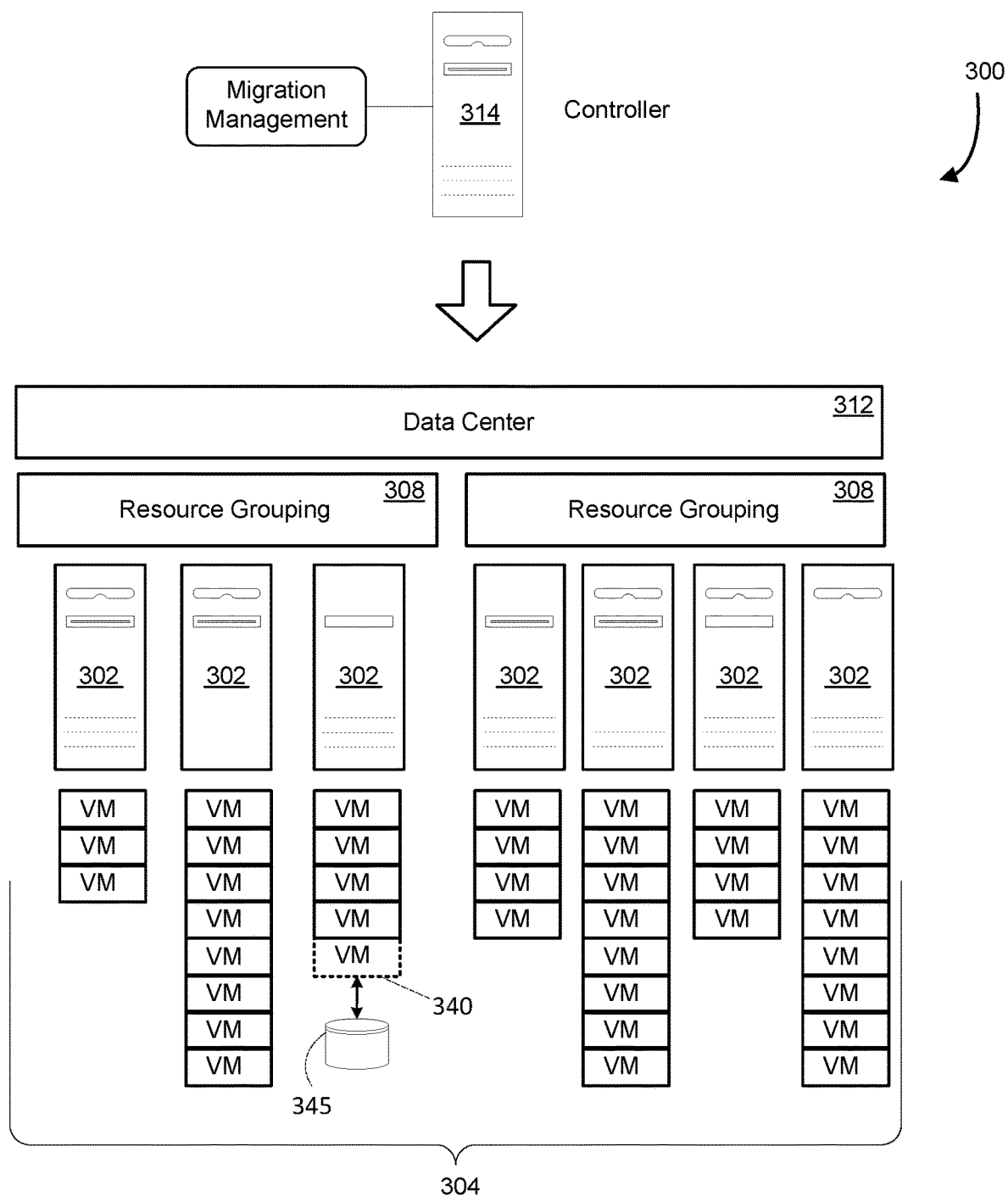
FIG. 4 is a diagram illustrating allocation and migration of virtual machine instances in accordance with the present disclosure.

Referring to FIG. 3, virtual machine 340 may be identified as a virtual machine that should be migrated from the physical host 302 which is currently hosting the virtual machine. Virtual machine 340 may also have attached a local disk 345. Local disk 345 may be local to the physical host 302 in order to quick access to the virtual machine 340. In other embodiments, local disk 345 may be allocated from other storage resources (not shown). Another physical host may be identified, based on one or more criteria, as a destination host for the virtual machine 340. Referring to FIG. 4, virtual machine 340 may be migrated to an identified physical host 302 when a performance threshold is met. It should be noted that virtual machines may be migrated between physical hosts within the same rack, within the same grouping, between groupings, between data centers, or between any two devices regardless of physical location and specific hardware and/or software configurations. In an embodiment, virtual machine 340 may be migrated subsequent to shutting down the virtual machine at the current host and prior to rebooting the virtual machine at the new host. The migration may utilize a previously scheduled migration for maintenance time associated with the current or source physical host. Additionally, local state data that is stored in local disk 345 for virtual machine 340 may also be migrated to the destination or new physical host based on a determination that migration of the local state data meets one or more criteria. The local state data may be migrated to local disk 345 which may be local to the new physical host 302 in order to provide quick access to the migrated virtual machine 340. In other embodiments, local disk 345 may be allocated from other storage resources (not shown) that are accessible to migrated virtual machine 340.

The event that is detected may be any command, request or other data that indicates that a shutdown/restart is in progress at a virtual machine or is scheduled to occur. In one embodiment, after detecting such an event, policy data may be sent to the computing device hosting the virtual machine that is to be shutdown/restarted. The policy data may indicate to the computing device that it contains virtual machines that need to be migrated. The policy data may also indicate that the computing device should begin monitoring in anticipation of the shutdown event.

In one embodiment, the policy data may also indicate a set of VM containers on which to filter the shutdown events to. The policy data may also include configuration data that indicates one or more criteria indicative of how much time may be allowed for the data transfer. For example, a local storage disk that is implemented as a 1 terabyte (TB) fully used resource virtual hard disk (VHD) may not have available capacity to meet the time criteria allowed for the migration. The criteria may be based on service provider policies, a service level agreement for the user of the virtual machine, an option selected by the user, or other sources.

In one embodiment, when the virtual machine shutdown event has been detected and the shutdown has completed, if the virtual machine is determined to be a virtual machine that is also marked to be subsequently migrated off the computing device, and if the size of the local disk is small enough to be completed in the indicated time frame, then instead of allowing the virtual machine to be restarted on the current computing device, the migration management function may indicate the container for the virtual machine should be marked for migration. In some implementations, the container may be faulted to indicate a migration action. In such an implementation, the fault may be sent to the migration management function 350 to indicate that a service healing and virtual machine migration is needed.

In response to an indication that the virtual machine is marked for migration, the migration management function 350 may initiate a modified maintenance workflow. As a part of the modified maintenance workflow, an appropriate destination node or computing device may be selected to which the virtual machine should be migrated.

When a destination location has been identified, the destination computing device may be prepared for accepting arbitrary data content so that it can receive the local disk data for the virtual machine being migrated. In one implementation, the local disk data may be the resource VHD content. In such an implementation, a mechanism creating a staged container may be invoked. The destination computing device may be provided data about the source computing device such as the IP address and user account/password. The preparation for the destination computing device to accept the virtual machine being migrated may include opening a port or endpoint, providing information for controlled access, such as an access control list (ACL), to allow the source computing device to talk to the destination computing device, and creating an appropriate location at which to place the content. In one embodiment, the local storage is located at the same location in the destination computing device as in the source computing device.

During the creation of the container or slot for the virtual machine in the destination computing device, the process may be modified so as not to create a new local storage disk at the new container since the content of the local disk will be provided from the source computing device. In an embodiment, the destination computing device and container details may be provided to the source computing device, which may trigger a mechanism to start the transfer of the contents of the virtual machine from the source computing device to the destination computing device.

In an embodiment, the migration management function 350 may initiate the data transfer workflow instruction at the source computing device and a transfer agent may be invoked to migrate the local storage disk from the source computing device to the destination computing device. If the migration completes successfully, the destination computing device may be notified by the virtual machine manager to proceed with launching the migrated virtual machine. In some embodiments, some or all of the processes required to effect the migration from the source computing device to the destination computing device may be performed node to node, and without the need for the virtual machine manager to interact directly in the process.

In some cases, the data migration may fault or may not complete data transfer within the expected period of time for a number of reasons, such as a slow data transfer, faulty destination, and the like. If the data migration faults or does not complete within the expected period of time, the source computing device or the migration management function 350 may make a determination to cancel the migration workflow. The source computing device may also make a determination to continue to start the virtual machine in-place at the source computing device so as to reduce impact to the user's ability to access the virtual machine. The status of the virtual machine may be provided to the migration management function 350 so that action can be taken to clean up the previously designated destination computing device and associated workflows. This may include, for example, freeing up allocated storage and processing resources for the container that had been allocated for the migration.

In an embodiment, the transfer workflow instruction may be configured to ensure that the virtual machine is either rebooted on the source computing device or the destination computing device but not both. The transfer workflow instruction may also be configured to ensure that the data transfer adheres to timing constraints and does not exceed predetermined time limits for effecting the data transfers. The service healing process may be configured to ensure that the data migration is completed before proceeding with launching the virtual machine. Furthermore, the source container, destination container states may be updated to provide the status of the migration. Other operations of the control plane such as connect/disconnect, waiting for network programming completion, destination container preparation, and the like, can proceed in parallel with the data transfer in accordance with the migration process.

In an embodiment, the transfer workflow may be configured to ensure that new leases on the storage disks are not obtained until it is determined that the migration will be successful. The virtual machine is in a shutdown state during the data transfer and there is not be a need to immediately obtain a new allocation of storage disk space. The virtual machine may be started on either the source or destination computing device depending on the success of the data transfer, and prematurely allocating storage disk space for the destination may consume unnecessary virtual machine management resources and block out use of storage capacity that may not be needed.

When the data transfer is completed, the source container may be removed using virtual machine teardown processes which may include reallocation of the container space for use by other resources, explicit overwriting of the locations, and the like.

In some embodiments, virtual machine users may be provided notification information for the disclosed opportunistic migration. In some implementations, the notifications may be provided to selected users based, for example, on the type and/or amount of virtual resources that are allocated to the user. The service provider may implement notification functionality in the host agent or other function that is configured to selectively provide the notifications to selected users for a predetermined class of containers.

In one embodiment, filtering functionality may be implemented in the virtual machine manager or other function of the service provider that is configured to filter containers based on a configuration-based policy. For example, such a function may provide subscription-based metadata filtering for the configuration-based policies.

Figure 5:
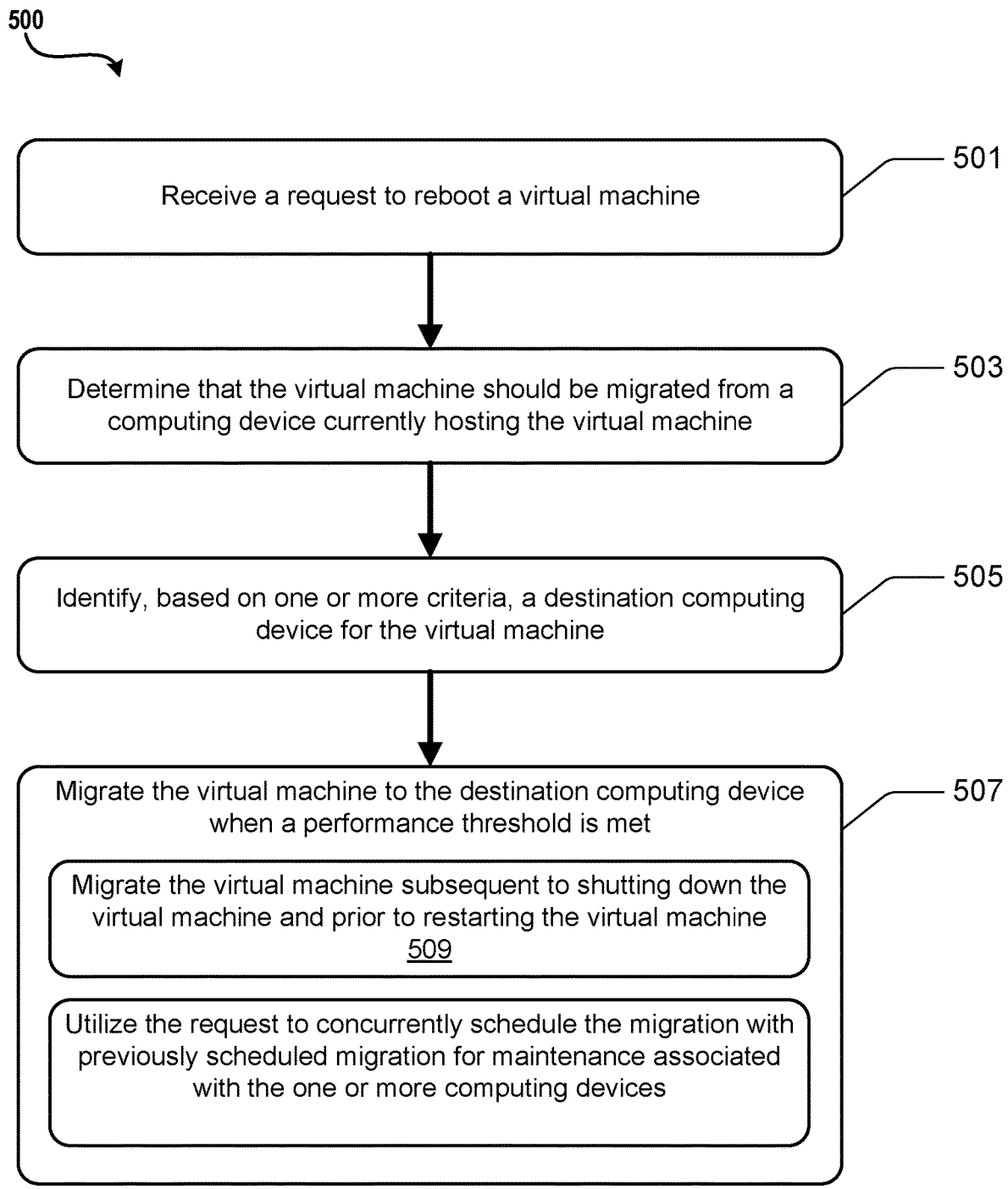
FIG. 5 is a flowchart depicting an example procedure for allocating virtual machines in accordance with the present disclosure.

Turning now to FIG. 5, illustrated is an example operational procedure for handling an opportunistic migration function in accordance with the present disclosure. In an embodiment, example operational procedure may implement a method for allocating virtual machines executing on one or more computing devices. Such an operational procedure may provide for opportunistic migration of virtual machines and can be provided by services such as the migration management function 350 in FIG. 3. The operational procedure may be implemented in a system comprising one or more computing devices comprising a plurality of VM containers configured to host virtual machine instances. Referring to FIG. 5, operation 501 illustrates receiving a request to reboot a virtual machine.

Operation 501 may be followed by operation 503. Operation 503 illustrates in response to the request, determining that the virtual machine should be migrated from a computing device currently hosting the virtual machine. For example, it may be determined that the virtual machine requires or would benefit from being hosted on a computing device with different or improved features. As another example, it may be determined that the current host computing device has a fault or has a threshold likelihood of a fault, and that the virtual machines executing on the host computing device should be migrated by a specified deadline to avoid interruption of service to the users of the virtual machines.

Operation 503 may be followed by operation 505. Operation 505 illustrates identifying, based on one or more criteria, a destination computing device for the virtual machine. In one example, the criteria may include performance characteristics such as processor speed, or a specified software/hardware configuration. The destination computing device may be identified based on available resources in the data center, such as available virtual machine containers that have not been allocated for other users.

Operation 505 may be followed by operation 507. Operation 507 illustrates migrating the virtual machine to the destination computing device when a performance threshold is met. In one example, the performance threshold may include an estimated time duration for the migration, which may be based on one or more of the estimated size of the virtual machine, the number and types of applications that are associated with the virtual machine, and the amount of data that is associated with the virtual machine. Operation 509 illustrates one embodiment where the virtual machine is migrated subsequent to shutting down the virtual machine at the current host and prior to restarting the virtual machine at the new host. The operation ends at Operation 511, which illustrates one embodiment where the migration utilizes the request to concurrently schedule the migration with previously scheduled maintenance associated with the one or more computing devices.

In some configurations, the performance threshold may be that the time for the migration is similar to the time for a standard reboot along with the time for the underlying action that requires the restart (for example, an operating system update). In some embodiments, the performance threshold may be based at least in part on a service level objective (SLO). An SLO may include objectives set by the service provider to meet efficiency, user satisfaction, and other objectives related to operation of a data center. The SLO may also include a service level agreement (SLA) for external users. For example, an SLA may be established with a user of the virtual machine and may require that the virtual machine be only taken down for threshold period of time. Before the migration, the amount of time that the virtual machine will be down may be determined. If it is determined that the migration will take longer than the threshold period of time, the migration may be delayed or cancelled. In another example, the SLA may specify that the total downtime for a user's virtual machine, which may be calculated as the total accumulated minutes or percentage of time where the user has no connectivity to the user's virtualized resources, cannot exceed a specified number. If the estimated downtime for the migration does not violate the total accumulated downtime, then the migration may be allowed to proceed.

In an embodiment, execution of the virtual machine may be continued on the hosting computing device when the performance threshold is not met. For example, the migration processes may be terminated and the virtual machine may be launched on the source computing device.

In an embodiment, local state data for the virtual machine may be migrated based on a determination that migration of the local state data meets one or more criteria. Some types of users may not need to save local state data, such as users internal to the service provider. However, if it is determined that the virtual machine has utilized its associated temporary local storage, the local storage may be preserved and marked for migration along with the virtual machine. In some embodiments, the local storage at the destination address may be kept at the same location as in the source.

In an embodiment, the one or more criteria includes a condition of the destination computing device.

In an embodiment, identifying the destination computing device is based in part on a software or hardware configuration.

In an embodiment, the determining that the virtual machine should be migrated is based at least in part on a predicted failure of the host computing device.

The method of claim 1, wherein the determining that the virtual machine should be migrated is based at least in part on a condition of the host computing device as determined by a machine learning function.

In an embodiment, the predicted failure of the host computing device is determined by:

identifying common attributes of the one or more computing devices; and calculating a predicted probability of failure of the host computing device based at least in part on historical data associated with failure of the one or more computing devices.

In an embodiment, the determining that the virtual machine should be migrated is based at least in part on a security issue of the one or more computing devices. For example, if there is a security vulnerability associated with the virtual machine's current host, then the service provider may determine that it is a higher priority to migrate the virtual machine than to adhere to the SLA or other criteria.

In an embodiment, the determining that the virtual machine should be migrated from the computing device is based at least in part on improvement to operation of a data center associated with the one or more computing devices. In an embodiment the improvement of operation of the data center includes reduction of fragmentation of allocated memory.

Figure 6:
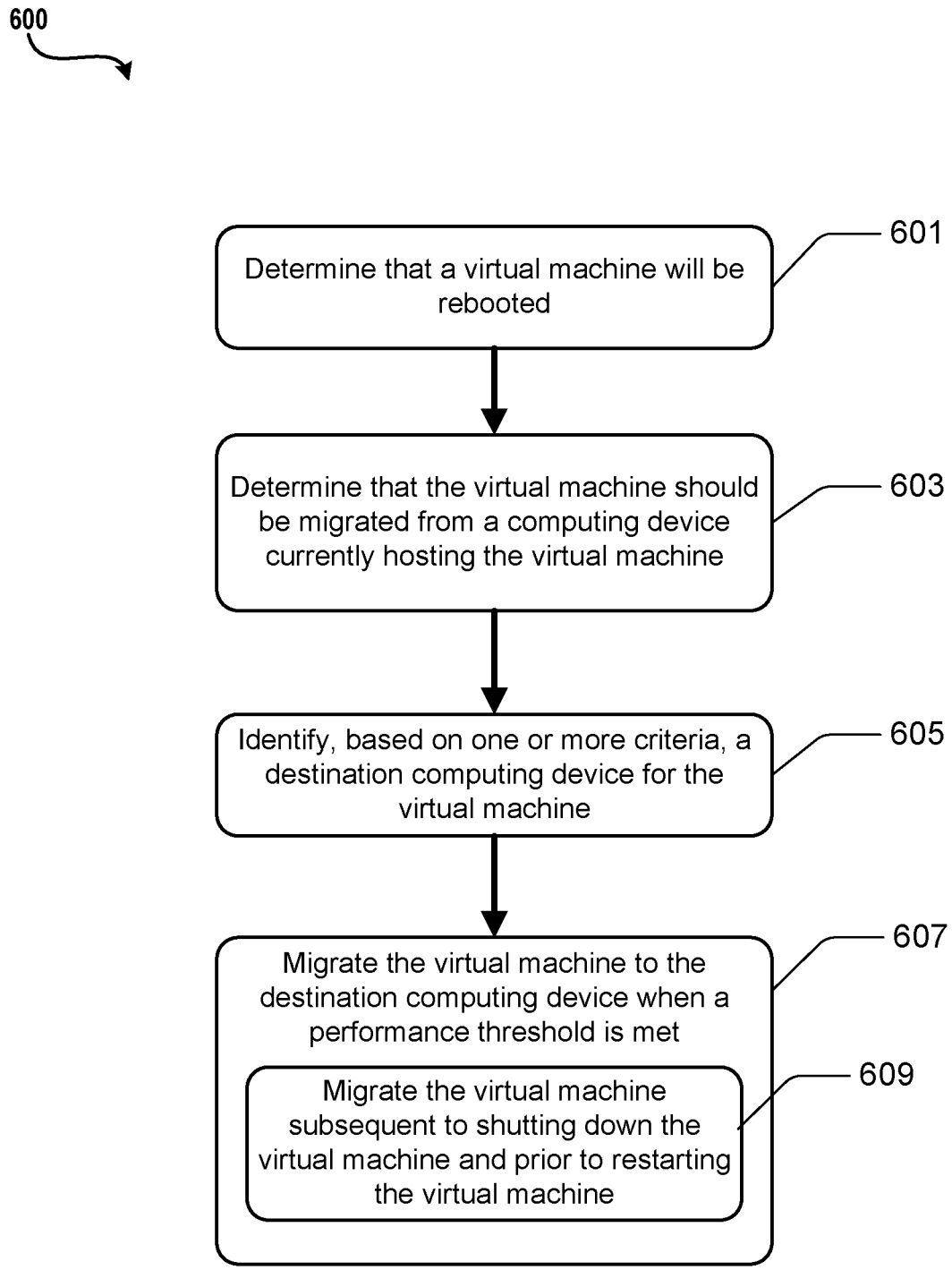
FIG. 6 is a flowchart depicting an example procedure for allocating virtual machines in accordance with the present disclosure.

Referring to FIG. 6, illustrated is another example operational procedure for handling an opportunistic migration function in accordance with the present disclosure. In an embodiment, example operational procedure may implement a system configured to allocate virtual machines executing on one or more computing devices. Such an operational procedure may provide for opportunistic migration of virtual machines and can be provided by services such as the migration management function 350 in FIG. 3. The operational procedure may be implemented in a system comprising one or more computing devices comprising a plurality of VM containers configured to host virtual machine instances. The operational procedure may be implemented in a system comprising one or more computing devices comprising a plurality of VM containers configured to host a virtual machine instance. Referring to FIG. 6, operation 601 illustrates determining that a virtual machine will be rebooted.

Operation 601 may be followed by operation 603. Operation 603 illustrates in response to the request, determining that the virtual machine should be migrated from a computing device currently hosting the virtual machine. For example, it may be determined that the virtual machine requires or would benefit from being hosted on a computing device with different or improved features. As another example, it may be determined that the current host computing device has a fault or has a threshold likelihood of a fault, and that the virtual machines executing on the host computing device should be migrated by a specified deadline to avoid interruption of service to the users of the virtual machines.

Operation 603 may be followed by operation 605. Operation 605 illustrates identifying, based on one or more criteria, a destination computing device for the virtual machine. In one example, the criteria may include performance characteristics such as processor speed, or a specified software/hardware configuration. The destination computing device may be identified based on available resources in the data center, such as available virtual machine containers that have not been allocated for other users.

Operation 605 may be followed by operation 607. Operation 607 illustrates migrating the virtual machine to the destination computing device when a performance threshold is met. In one example, the performance threshold may include an estimated time duration for the migration, which may be based on one or more of the estimated size of the virtual machine, the number and types of applications that are associated with the virtual machine, and the amount of data that is associated with the virtual machine.

Operation 607 may be followed by operation 609. Operation 609 illustrates that the virtual machine migration is performed subsequent to shutting down the virtual machine and prior to restarting the virtual machine, where FIG. 6 ends.

In an embodiment, the migration utilizes the request to perform the migrating in conjunction with a previously scheduled migration for maintenance associated with the currently hosting computing device.

In an embodiment, the migration comprises migrating local state data for the virtual machine based on a determination that migration of the local state data meets the performance threshold.

In an embodiment, said migrating local state data comprises preserving the virtual machine's state data stored in a local temporary disk that is attached to the virtual machine.

In an embodiment, the performance threshold is based at least in part on a service level objective (SLO).

In an embodiment, identifying the destination computing device is based in part on determining that a software or hardware configuration of the destination computing device meets requirements for the virtual machine.

Figure 7:
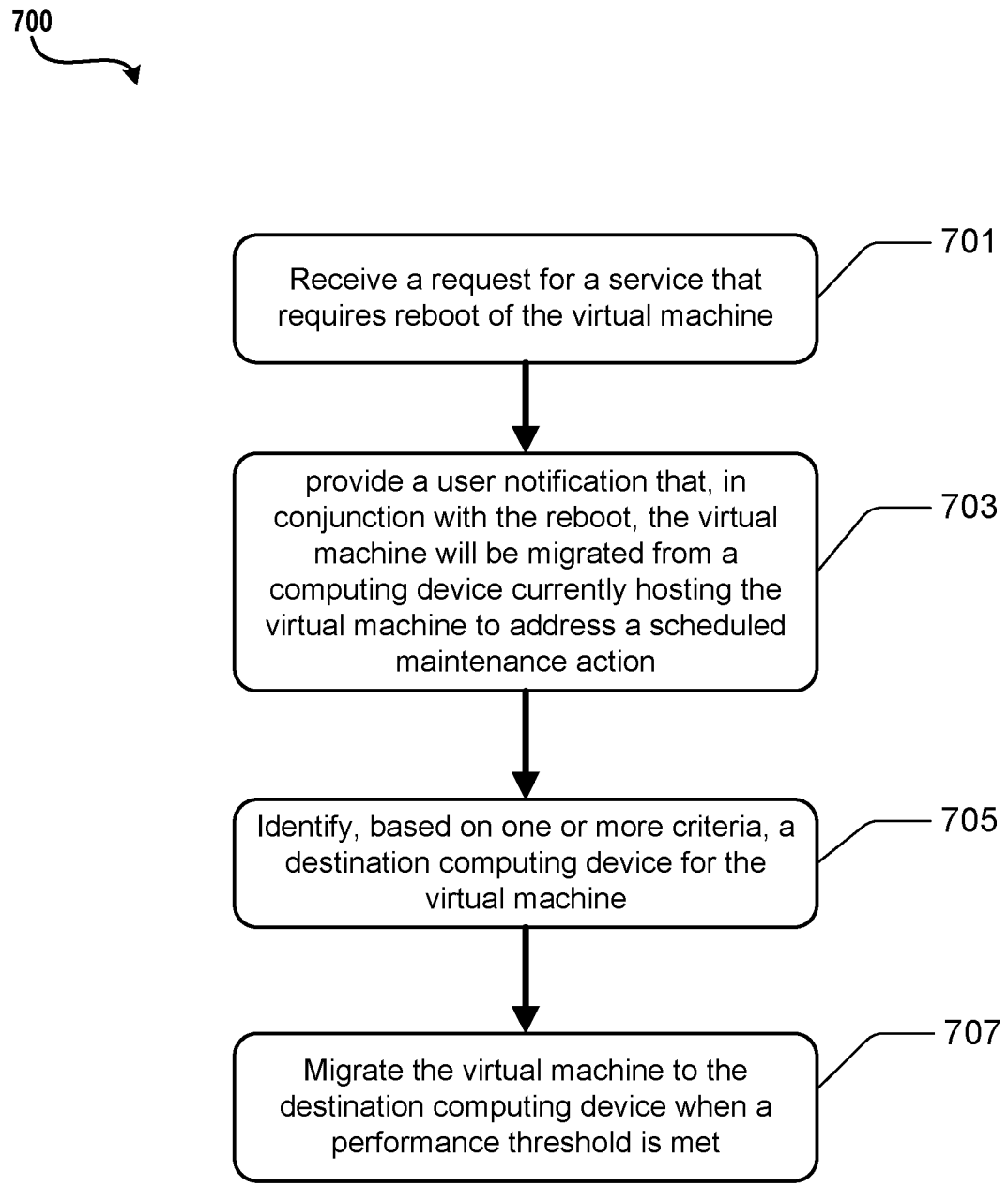
FIG. 7 is a flowchart depicting an example procedure for allocating virtual machines in accordance with the present disclosure.

Referring to FIG. 7, illustrated is an example operational procedure for handling an opportunistic migration function in accordance with the present disclosure. In an embodiment, example operational procedure may implement a computer-readable storage medium having computer-executable instructions stored thereupon which, when executed by one or more processors of a computing device, cause the computing device to perform operations for allocating virtual machines executing on one or more computing devices. Such an operational procedure may provide for opportunistic migration of virtual machines and can be provided by services such as the migration management function 350 in FIG. 3. The operational procedure may be implemented in a system comprising one or more computing devices comprising a plurality of containers configured to host a virtual machine instance. Referring to FIG. 7, Operation 701 illustrates receiving a request for a service that requires reboot of the virtual machine.

Operation 701 may be followed by Operation 703. Operation 703 illustrates providing a user notification that, in conjunction with the reboot, the virtual machine will be migrated from a computing device currently hosting the virtual machine in order to address a scheduled maintenance action for the computing device. For example, it may be determined that the virtual machine requires or would benefit from being hosted on a computing device with different or improved features. As another example, it may be determined that the current host computing device has a fault or has a threshold likelihood of a fault, and that the virtual machines executing on the host computing device should be migrated by a specified deadline to avoid interruption of service to the users of the virtual machines.

Operation 703 may be followed by Operation 705. Operation 705 illustrates, based on one or more criteria, a destination computing device for the virtual machine is identified for the migration. In one example, the criteria may include performance characteristics such as processor speed, or a specified software/hardware configuration. The destination computing device may be identified based on available resources in the data center, such as available virtual machine containers that have not been allocated for other users.

Operation 705 may be followed by Operation 707. Operation 707 illustrates that the virtual machine is migrated to the destination computing device when a performance threshold is met, where FIG. 7 ends. In one example, the performance threshold may include an estimated time duration for the migration, which may be based on one or more of the estimated size of the virtual machine, the number and types of applications that are associated with the virtual machine, and the amount of data that is associated with the virtual machine.

In an embodiment, the computer-readable storage medium further comprises computer-executable instructions stored thereupon which, when executed by one or more processors of a computing device, cause the computing device to receive a user input to proceed with the migration. Additionally, the user notification may be removed in response to the user input.

In an embodiment, the computer-readable storage medium further comprises computer-executable instructions stored thereupon which, when executed by one or more processors of a computing device, cause the computing device to terminate the migration based on determine that a time duration for the migration has exceeded a time threshold.

In some embodiments, an expert system that utilizes logical inferences based on the available information may be used to identify candidates for destination host computing devices. For example, an expert system may take available information pertaining to actual failures of devices and use the information as input to a rules-based system to generate probabilities of failures. The available information may be provided to, for example, a Bayesian process to determine an updated probability for the event.

In some embodiments, the probability analysis may be performed based on machine learning via a machine learning system that includes one or more learning functions configured to learn the probabilities associated with the availability of various data that may be relevant to the determination of the event rate. This probability analysis may also be performed based on history data of prior probability analyses or performed based on a user indication of a rule to be used in the probability calculation.

Example Clauses

The disclosure presented herein may be considered in view of the following clauses.

Example Clause A, a computer-implemented method for allocating virtual machines executing on one or more computing devices, the method comprising:
  receiving a request to reboot a virtual machine;
  in response to the request, determining that the virtual machine should be migrated from a computing device currently hosting the virtual machine;
  identifying, based on one or more criteria, a destination computing device for the virtual machine; and
  subsequent to shutting down the virtual machine and prior to restarting the virtual machine, migrating the virtual machine to the destination computing device when a performance threshold is met, wherein the migration utilizes the request to concurrently schedule the migration with previously scheduled maintenance associated with the one or more computing devices, and wherein the migrating comprises migrating local state data for the virtual machine based on a determination that migration of the local state data meets the performance threshold.

Example Clause B, the computer-implemented method of Example Clause A, wherein the performance threshold is based at least in part on a service level objective (SLO).

Example Clause C, the computer-implemented method of any one of Example Clauses A through B, further comprising continuing execution of the virtual machine on the hosting computing device when the performance threshold is not met.

Example Clause D, the computer-implemented method of any one of Example Clauses A through C, wherein said migrating local state data comprises preserving state data stored in a local temporary disk that is attached to the virtual machine.

Example Clause E, the computer-implemented method of any one of Example Clauses A through D wherein the one or more criteria for identifying the destination computing device includes a condition of the destination computing device.

Example Clause F, the computer-implemented method of any one of Example Clauses A through E, wherein identifying the destination computing device is based in part on a software or hardware configuration.

Example Clause G, the computer-implemented method of any one of Example Clauses A through F, wherein said determining that the virtual machine should be migrated is based at least in part on a predicted failure of the host computing device.

Example Clause H, the computer-implemented method of any one of Example Clauses A through G, wherein said determining that the virtual machine should be migrated is based at least in part on a condition of the host computing device as determined by a machine learning function.

Example Clause I, the computer-implemented method of any one of Example Clauses A through H, wherein said predicted failure of the host computing device is determined by:
  identifying common attributes of the one or more computing devices; and
  calculating a predicted probability of failure of the host computing device based at least in part on historical data associated with failure of the one or more computing devices.

Example Clause J, the computer-implemented method of any one of Example Clauses A through I, wherein said determining that the virtual machine should be migrated is based at least in part on a security issue of the one or more computing devices.

Example Clause K, the computer-implemented method of any one of Example Clauses A through J, wherein said determining that the virtual machine should be migrated from the computing device is based at least in part on improvement to operation of a data center associated with the one or more computing devices.

Example Clause L, a system, comprising:
  one or more processors; and
  a memory in communication with the one or more processors, the memory having computer-readable instructions stored thereupon that, when executed by the one or more processors, cause the system to perform operations comprising:
    determining that a virtual machine will be rebooted;
    in response to determining that the virtual machine will be rebooted, determining that the virtual machine should be migrated from a computing device currently hosting the virtual machine;
    identifying, based on one or more criteria, a destination computing device for the virtual machine; and
    subsequent to shutting down the virtual machine and prior to restarting the virtual machine, migrating the virtual machine to the destination computing device when a performance threshold is met.

Example Clause M, the computer-implemented method of any one of Example Clause L, wherein the migration utilizes the request to perform the migrating in conjunction with a previously scheduled migration for maintenance associated with the currently hosting computing device.

Example Clause N, the computer-implemented method of any one of Example Clauses L through M, wherein the migrating comprises migrating local state data for the virtual machine based on a determination that migration of the local state data meets the performance threshold.

Example Clause O, the computer-implemented method of any one of Example Clauses L through N, wherein said migrating local state data comprises preserving the state data stored in a local temporary disk that is attached to the virtual machine.

Example Clause P, the computer-implemented method of any one of Example Clauses L through O, wherein the performance threshold is based at least in part on a service level objective (SLO).

Example Clause Q, the computer-implemented method of any one of Example Clauses L through P, wherein identifying the destination computing device is based in part on determining that a software or hardware configuration of the destination computing device meets requirements for the virtual machine.

Example Clause R, a computer-readable storage medium having computer-executable instructions stored thereupon which, when executed by one or more processors of a computing device, cause the computing device to:
  receive a request for a service that requires reboot of the virtual machine; and
  provide a user notification that, in conjunction with the reboot, the virtual machine will be migrated from a computing device currently hosting the virtual machine in order to address a scheduled maintenance action for the computing device;

wherein, based on one or more criteria, a destination computing device for the virtual machine is identified for the migration, and wherein the virtual machine is migrated to the destination computing device when a performance threshold is met.

Example Clause S, the computer-implemented method of Example Clause R, further comprising computer-executable instructions stored thereupon which, when executed by one or more processors of a computing device, cause the computing device to:

receive a user input to proceed with the migration; and
remove the user notification in response to the user input.

Example Clause T, the computer-implemented method of any one of Example Clauses R through S, further comprising computer-executable instructions stored thereupon which, when executed by one or more processors of a computing device, cause the computing device to terminate the migration based on determining that a time duration for the migration has exceeded a time threshold.

The various aspects of the disclosure are described herein with regard to certain examples and embodiments, which are intended to illustrate but not to limit the disclosure. It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems. The embodiments described herein may also be practiced in distributed computing environments, where tasks are performed by remote processing devices that are linked through a communications network. In a distributed computing environment, program modules may be located in both local and remote memory storage devices.

Networks established by or on behalf of a user to provide one or more services (such as various types of cloud-based computing or storage) accessible via the Internet and/or other networks to a distributed set of clients may be referred to as a service provider. Such a network may include one or more data centers such as data center 100 illustrated in FIG. 1, which are configured to host physical and/or virtualized computer servers, storage devices, networking equipment and the like, that may be used to implement and distribute the infrastructure and services offered by the service provider.

Figure 8:
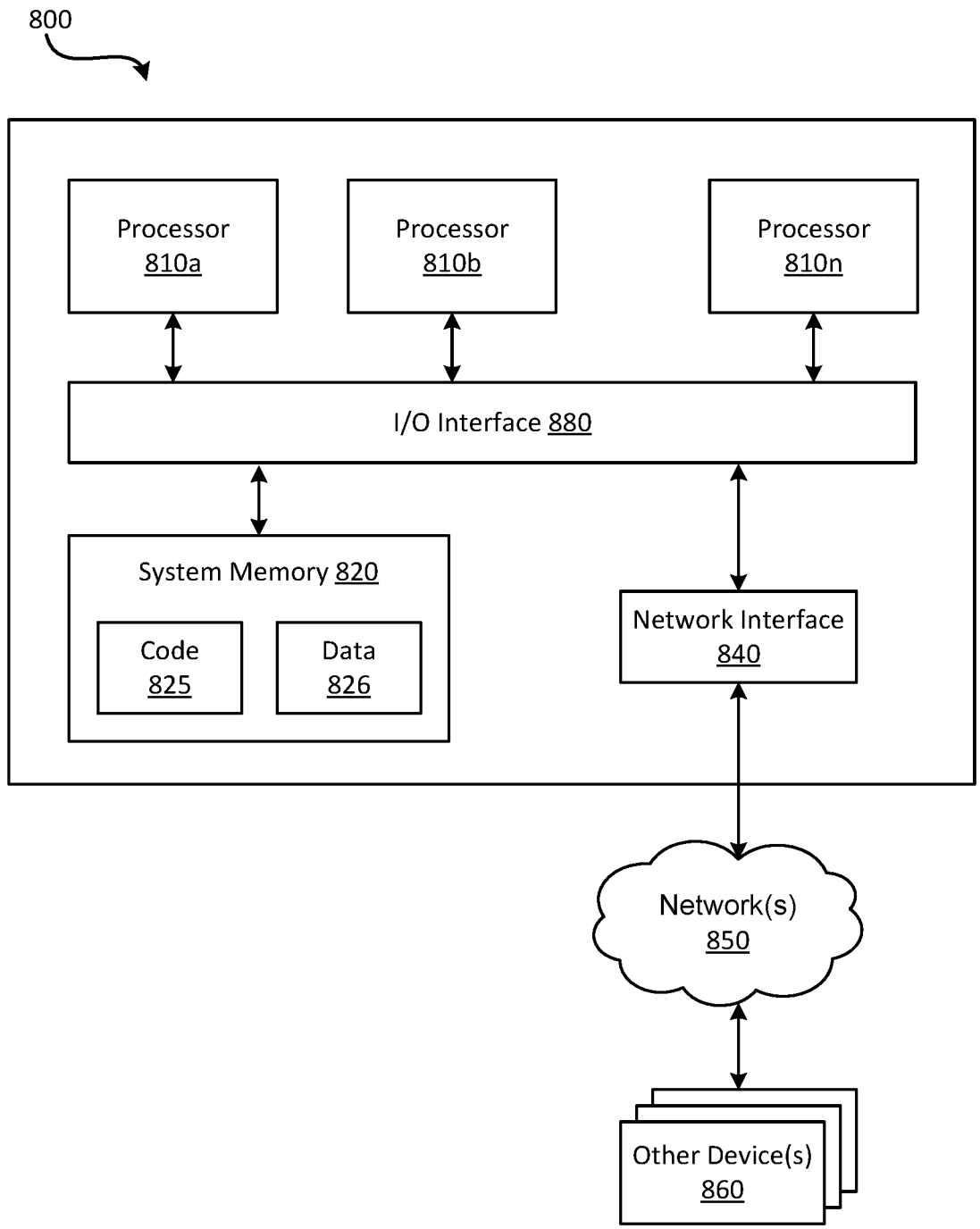
FIG. 8 is an example computing device in accordance with the present disclosure.

In some embodiments, a server that implements a portion or all of one or more of the technologies described herein, including the techniques to implement the allocation of virtual machines may include a general-purpose computer system that includes or is configured to access one or more computer-accessible media. FIG. 8 illustrates such a general-purpose computing device 800. In the illustrated embodiment, computing device 800 includes one or more processors 810*a*, 810*b*, and/or 810*n* (which may be referred herein singularly as "a processor 810" or in the plural as "the processors 810") coupled to a system memory 820 via an input/output (I/O) interface 830. Computing device 800 further includes a network interface 840 coupled to I/O interface 830.

In various embodiments, computing device 800 may be a uniprocessor system including one processor 810 or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by processor(s) 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques and data described above, are shown stored within system memory 820 as code 825 and data 826.

In one embodiment, I/O interface 830 may be configured to coordinate I/O traffic between the processor 810, system memory 820, and any peripheral devices in the device, including network interface 840 or other peripheral interfaces. In some embodiments, I/O interface 830 may perform any necessary protocol, timing, or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components. Also, in some embodiments some or all of the functionality of I/O interface 830, such as an interface to system memory 820, may be incorporated directly into processor 810.

Network interface 840 may be configured to allow data to be exchanged between computing device 800 and other device or devices 860 attached to a network or network(s) 850, such as other computer systems or devices as illustrated in FIGS. 1 through 4, for example. In various embodiments, network interface 840 may support communication via any suitable wired or wireless general data networks, such as types of Ethernet networks, for example. Additionally, network interface 840 may support communication via telecommunications/telephony networks such as analog voice networks or digital fiber communications networks, via storage area networks such as Fibre Channel SANs or via any other suitable type of network and/or protocol.

In some embodiments, system memory 820 may be one embodiment of a computer-accessible medium configured to store program instructions and data as described above for FIGS. 1-7 for implementing embodiments of the corresponding methods and apparatus. However, in other embodiments, program instructions and/or data may be received, sent or stored upon different types of computer-accessible media. A computer-accessible medium may include non-transitory storage media or memory media, such as magnetic or optical media, e.g., disk or DVD/CD coupled to computing device 800 via I/O interface 830. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 800 as system memory 820 or another type of memory. Further, a computer-accessible medium may include transmission media or signals such as electrical, electromagnetic or digital signals, conveyed via a communication medium such as a network and/or a wireless link, such as may be implemented via network interface 840. Portions or all of multiple computing devices, such as those illustrated in FIG. 8, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Various storage devices and their associated computer-readable media provide non-volatile storage for the computing devices described herein. Computer-readable media as discussed herein may refer to a mass storage device, such as a solid-state drive, a hard disk or CD-ROM drive. However, it should be appreciated by those skilled in the art that computer-readable media can be any available computer storage media that can be accessed by a computing device.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing devices discussed herein. For purposes of the claims, the phrase "computer storage medium," "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the disclosed computing devices in order to store and execute the software components and/or functionality presented herein. It is also contemplated that the disclosed computing devices may not include all of the illustrated components shown in FIG. 8, may include other components that are not explicitly shown in FIG. 8, or may utilize an architecture completely different than that shown in FIG. 8.

Although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated any reference to "first," "second," etc. items and/or abstract concepts within the description is not intended to and should not be construed to necessarily correspond to any reference of "first," "second," etc. elements of the claims. In particular, within this Summary and/or the following Detailed Description, items and/or abstract concepts such as, for example, individual computing devices and/or operational states of the computing cluster may be distinguished by numerical designations without such designations corresponding to the claims or even other paragraphs of the Summary and/or Detailed Description. For example, any designation of a "first operational state" and "second operational state" of the computing cluster within a paragraph of this disclosure is used solely to distinguish two different operational states of the computing cluster within that specific paragraph—not any other paragraph and particularly not the claims.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method for allocating virtual machines executing on one or more computing devices, the method comprising:
    receiving a request to reboot a virtual machine;
    in response to the request, determining that the virtual machine requires maintenance such that a migration from a computing device currently hosting the virtual machine should be scheduled, the determining based at least in part on a predicted failure of the host computing device, the predicted failure determined by:
        identifying common attributes of the host computing device and the one or more computing devices; and
        calculating a predicted probability of failure of the host computing device and the one or more computing devices based at least in part on historical data associated with failure of the host computing device and the one or more computing devices;
    identifying, based on second criteria, a destination computing device for the virtual machine that meets or exceeds the second criteria;
    concurrently scheduling the migration with the reboot when it is determined that the migration should be allowed to proceed based on a time and resources threshold for performing the migration, wherein the migration includes migrating local state data for the virtual machine; and
    subsequent to shutting down the virtual machine and prior to restarting the virtual machine, migrating the virtual machine to the destination computing device.

2. The method of claim 1, wherein the time and resources threshold is based at least in part on a service level objective (SLO).

3. The method of claim 1, further comprising continuing execution of the virtual machine on the hosting computing device when the time and resources threshold is not met.

4. The method of claim 1, wherein said migrating local state data comprises preserving state data stored in a local temporary disk that is attached to the virtual machine.

5. The method of claim 1, wherein the second criteria for identifying the destination computing device includes a condition of the destination computing device.

6. The method of claim 1, wherein identifying the destination computing device is based in part on a software or hardware configuration.

7. The method of claim 1, wherein said determining that the virtual machine should be migrated is based at least in part on a condition of the host computing device as determined by a machine learning function.

8. The method of claim 1, wherein said determining that the virtual machine should be migrated is based at least in part on a security issue of the one or more computing devices.

9. The method of claim 1, wherein said determining that the virtual machine should be migrated from the computing device is based at least in part on improvement to operation of a data center associated with the one or more computing devices.

10. A system, comprising:
    one or more processors; and
    a memory in communication with the one or more processors, the memory having computer-readable instructions stored thereupon that, when executed by the one or more processors, cause the system to perform operations comprising:
    determining that a virtual machine will be rebooted, the virtual machine hosted on a host computing device of a virtual computing environment;
    in response to determining that the virtual machine will be rebooted, determining that the virtual machine requires maintenance such that a migration from a computing device currently hosting the virtual machine should be scheduled, the determining based at least in part on a predicted failure of the host computing device, the predicted failure determined by:
        identifying common attributes of the host computing device and other computing devices of the virtual computing environment; and
        calculating a predicted probability of failure of the host computing device and the other computing devices based at least in part on historical data associated with failure of the host computing device and the other computing devices;
    identifying, based on second criteria, a destination computing device for the virtual machine that meets or exceeds the second criteria;
    concurrently scheduling the migration with the reboot when it is determined that the migration should be allowed to proceed based on a time and resources threshold for performing the migration; and
    subsequent to shutting down the virtual machine and prior to restarting the virtual machine, migrating the virtual machine to the destination computing device.

11. The system of claim 10, wherein the migration utilizes the request to perform the migrating in conjunction with a previously scheduled migration for maintenance associated with the currently hosting computing device.

12. The system of claim 10, wherein the migrating comprises migrating local state data for the virtual machine based on a determination that migration of the local state data meets a performance threshold.

13. The system of claim 12, wherein said migrating local state data comprises preserving the state data stored in a local temporary disk that is attached to the virtual machine.

14. The system of claim 12, wherein the performance threshold is based at least in part on a service level objective (SLO).

15. The system of claim 10, wherein identifying the destination computing device is based in part on determining that a software or hardware configuration of the destination computing device meets requirements for the virtual machine.

16. A computer-readable storage medium having computer-executable instructions stored thereupon which, when executed by one or more processors of a computing device, cause the computing device to:

receive a request for a service that requires reboot of a virtual machine, the virtual machine hosted on a host computing device of a virtual computing environment;

in response to the request, determining that the virtual machine requires maintenance such that a migration from a computing device currently hosting the virtual machine should be scheduled, the determining based at least in part on a predicted failure of the host computing device, the predicted failure determined by:

identifying common attributes of the host computing device and other computing devices of the virtual computing environment; and calculating a predicted probability of failure of the host computing device and the other computing devices based at least in part on historical data associated with failure of the host computing device and the other computing devices;

identifying, based on second criteria, a destination computing device for the virtual machine that meets or exceeds the second criteria;

concurrently scheduling the migration with the reboot when it is determined that the migration should be allowed to proceed based on a time and resources threshold for performing the migration, wherein the migration includes migrating local state data for the virtual machine; and provide a user notification that, in conjunction with the reboot, the virtual machine will be migrated from a computing device currently hosting the virtual machine in order to address a scheduled maintenance action for the computing device.

17. The computer-readable storage medium of claim 16, further comprising computer-executable instructions stored thereupon which, when executed by one or more processors of a computing device, cause the computing device to:

receive a user input to proceed with the migration; and remove the user notification in response to the user input.

18. The computer-readable storage medium of claim 16, further comprising computer-executable instructions stored thereupon which, when executed by one or more processors of a computing device, cause the computing device to terminate the migration based on determining that a time duration for the migration has exceeded a time threshold.

* * * * *